United States Patent [19]

Uchida

[11] Patent Number: 4,679,730
[45] Date of Patent: Jul. 14, 1987

[54] HEATER FOR WARMING AN OPERATOR OF A VEHICLE

[75] Inventor: Goroh Uchida, Toyota, Japan

[73] Assignee: Toyota Jidosha Kabushiki Kaisha, Japan

[21] Appl. No.: 697,023

[22] Filed: Jan. 31, 1985

[30] Foreign Application Priority Data

Apr. 10, 1984 [JP] Japan .................................. 59-71427

[51] Int. Cl.⁴ ............................................. B60H 1/02
[52] U.S. Cl. ........................... 237/12.3 R; 237/12.3 A
[58] Field of Search .................... 237/12.3 R, 12.3 A; 98/2.08; 165/42; 219/202, 203

[56] References Cited

U.S. PATENT DOCUMENTS 4,004,126  1/1977  Boaz ..................................... 98/2.08
4,562,957  1/1986  Nakagawa et al. ............. 237/12.3 R

FOREIGN PATENT DOCUMENTS 518570  4/1953  Belgium ......................... 237/12.3 A
2322484  11/1974  Fed. Rep. of Germany ..... 237/12.3 A Primary Examiner—Henry A. Bennet
Attorney, Agent, or Firm—Parkhurst & Oliff

[57] ABSTRACT

A heating apparatus for supplying desired amounts of warm air toward an operator of a vehicle. The apparatus comprises a plurality of compartments, located under the steering column. A forwardly located heavier compartment includes an air blower, a heater and an inlet passage. The inlet passage is provided with filters to prevent dust from entering the heating system. A rearwardly located lighter compartment includes an air duct and an outlet passage. The air duct is covered with insulating material and the outlet passage directs warm air toward the operator of the vehicle. The heating assembly is further provided with a plurality of mounting device to affix it to the vehicle.

17 Claims, 3 Drawing Figures

HEATER FOR WARMING AN OPERATOR OF A VEHICLE

BACKGROUND OF THE INVENTION

The present invention relates generally to a heater for warming an operator of a vehicle, and more particularly to a heating assembly divided into a plurality of compartments, namely, a heavier forwardly located compartment and a lighter rearwardly located compartment. The heavier forwardly located compartment is attached to a solid steering column and the lighter rearwardly located compartment is attached to a steering column cover such that almost all vibrations and noise generated during the operation of the heater are eliminated.

Previous attempts to place a heater onto a steering column of a vehicle to supply desirable amounts of warm air to an operator have involved attaching the heater onto an exterior surface of a steering column cover, which encloses the steering column therein. The known heater includes a casing having an air blower and a heating means therein. Air is supplied by the air blower and the air is warmed by the heating means. The warm air is ventilated in the direction of the operator through an air duct defined in the casing. The rear end of the casing is open to form an air outlet or an opening through which the warm air ventilates in the direction of the operator.

The air blower and heating means exert a substantial force upon the exterior surface of the steering column cover which must sustain this substantial force. Hence, the steering column cover has to be of sufficient strength to sustain all forces exerted by the air blower and the heater upon it. This requires the steering column cover to be of sufficient strength which can increase the weight of the assembly and result in higher production costs. The steering column cover must be of sufficient strength, otherwise, when the heater operates vibrations and noise occur due to the heater being mounted on the light-weight steering column cover.

SUMMARY OF THE INVENTION

The present invention is made in view of the foregoing background and to overcome the foregoing drawbacks. It is accordingly an object of this invention to provide a novel heater which decreases the weight of the entire heater assembly by permitting the steering column cover to be made of a light-weight material while simultaneously substantially eliminating vibrations and noise generated by operator of the heater.

To attain the above objects, the novel heater assembly according to the present invention includes a steering wheel attached to a steering shaft, which rotates in angular displacements with the steering wheel; a steering column surrounding the steering shaft, the steering column being supported by the vehicle body. A steering column cover encloses the steering column therein. The heater assembly includes a casing having at least two compartments, a forward compartment being mounted on the steering column and is attached in a space defined between the steering column and the steering column cover and a rearward compartment being mounted to the steering column cover. An air blower is provided within the forward compartment to supply desirable amounts of air. The air supplied by the air blower is warmed by a heating means which is also provided within the forward compartment. The rearward compartment includes an air duct which is also provided between the steering column and the steering column cover. The air duct has at least one air outlet or an opening through which warm air is directed toward the operator.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
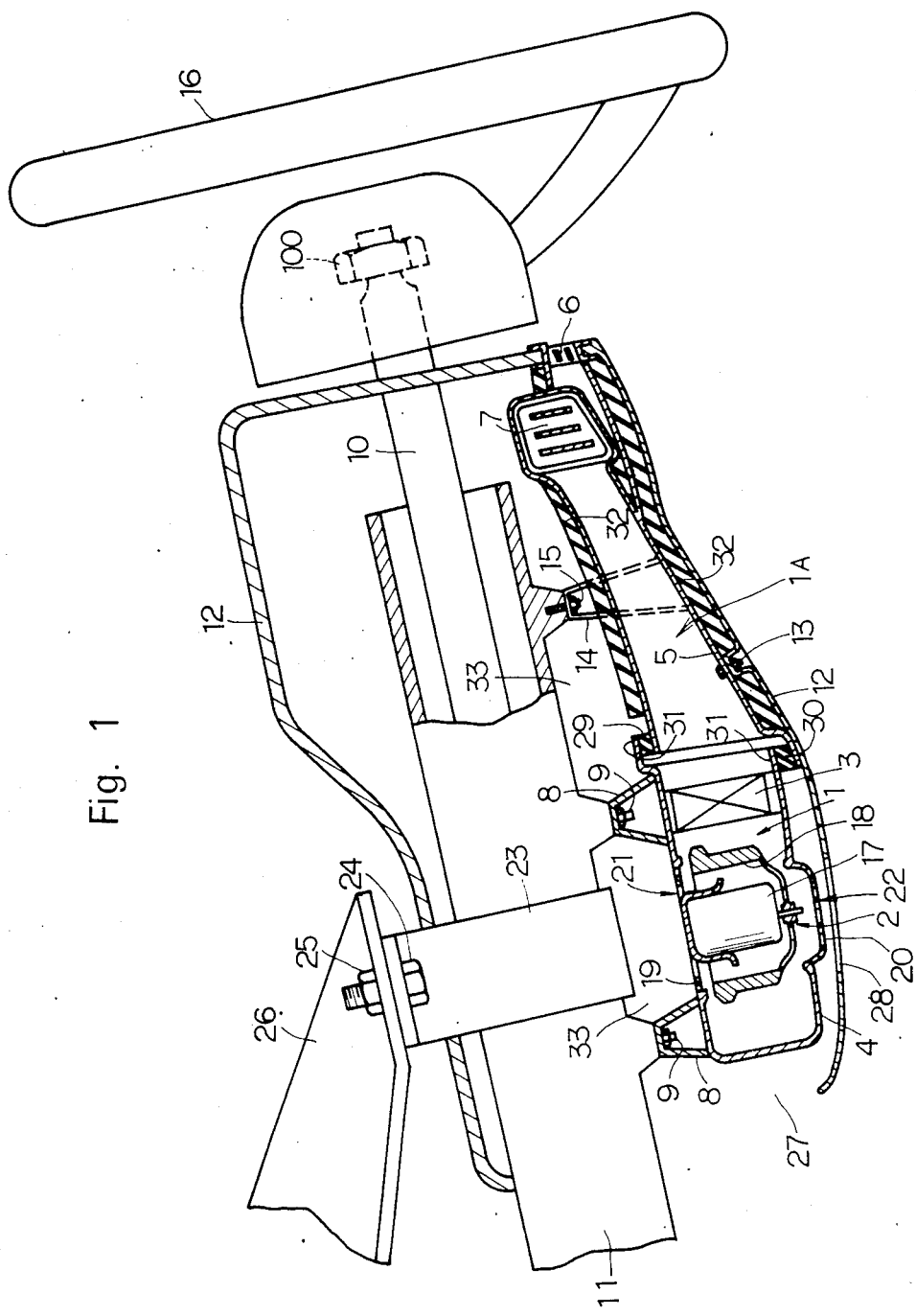
FIG. 1 is a longitudinal cross-sectional view of a vehicle steering structure in which a heater according to the present invention is attached.

FIG. 1 shows a longitudinal cross-sectional view of a steering structure which utilizes a heater according to the present invention. A steering wheel 16 attached to a steering shaft 10 by a nut 100 and the steering shaft rotates in angular displacements with the steering wheel. A steering column 11 surrounds the steering shaft 10. The steering column 11 is fastened by a bracket 23 onto a extension 26 of a vehicle body. The bracket 23 is fixed by a bolt 26 and a nut 25 to the extension 26. A steering column cover 12 encloses the steering column 11. The heating assembly includes a casing 4 mounted on to a steering column 11 by means of brackets 8. The brackets 8 are fastened by bolts 9 on the steering column 11. The casing 4 is attached in a space 27 defined between the steering column 11 and the steering column cover 12. The casing 4 includes a forward compartment 1 which contains an air blower 2 and heater 3 and mounted on to the casing, and a rearward compartment 1A in which an air duct 5 is provided. The rearward compartment 1A containing the air duct 5 contacts with end(s) 31 of the forward compartment 1 through cushioning members 29 and 30, preferably made from sponge-like materials. The cushioning members 29 and 30 also act as sealing members to produce a substantially air-tight coupling between the forward and rearward compartments.

Figure 2:
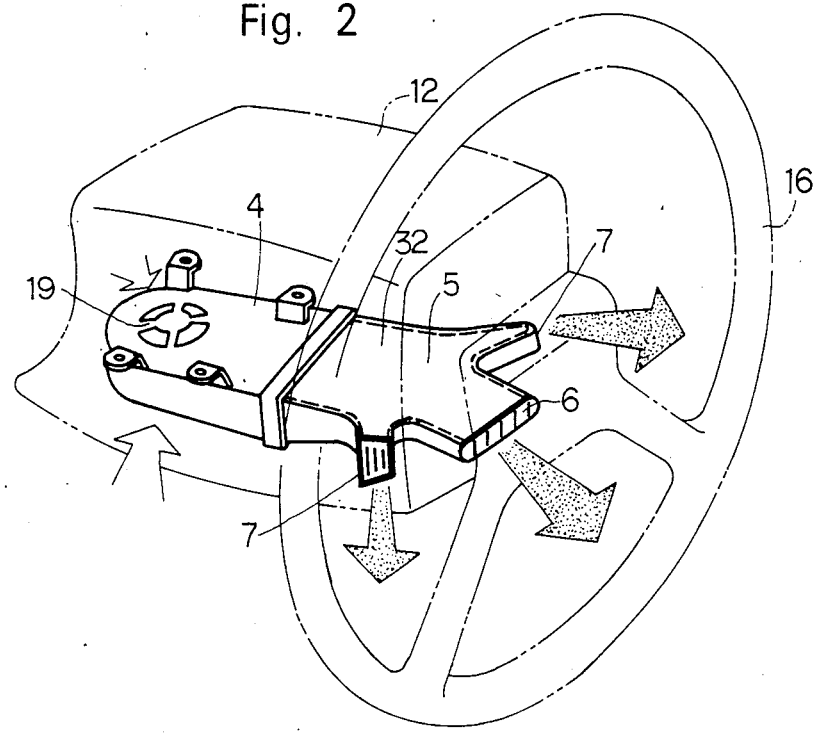
FIG. 2 is a partial perspective view of the heater which illustrates the rear end portion of the heater assembly according to the present invention attached to the vehicle steering structure.
Figure 3:
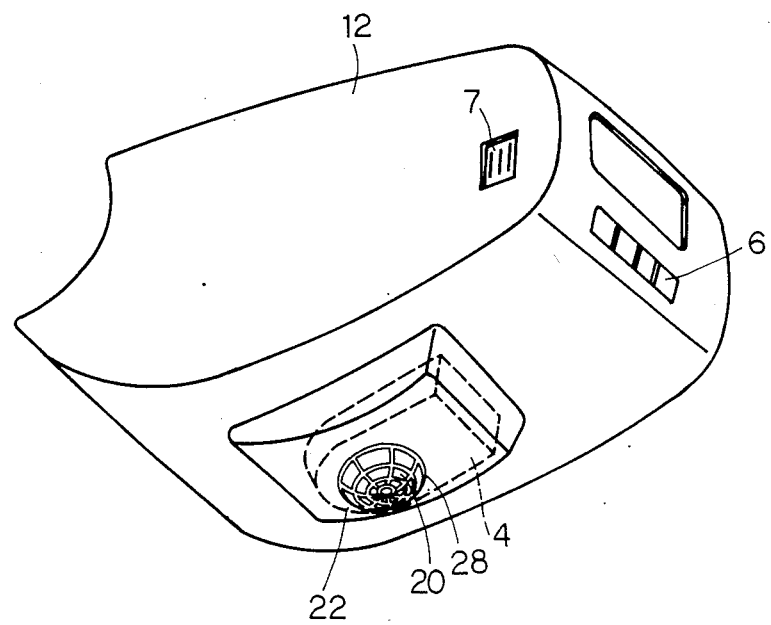
FIG. 3 is a partial perspective view of a steering column cover.

The forward compartment 1 is relatively heavier in comparison to the rearward compartment 1A. The rearward compartment 1A of the casing 4 is fastened by screws 13 onto a lower surface of the steering column cover 12. The steering column cover 12 is fixed by a bracket 14 onto the steering column 11. The bracket 14 is fixed by a bolt 15 onto the steering column 11. The air blower 2 placed in forward compartment 1 of casing 4 comprises a motor 17 and a warm air fan 18. Air suction openings 21 and 22 are provided in the casing 4. The air suction opening 21 is provided on the upper surface of casing 4 and corresponds with the upper end of the air blower. The air suction opening 22 is provided on the lower surface of casing 4 and further is in communication with an air inlet opening 28 provided in the steering column cover 12. The air suction openings 21 and 22 are covered with filters, preferably meshes 19 and 20 thereon to prevent foreign matter like dust, etc. from entering into heating assembly. Thus, air free from impurities can be suctioned readily into both openings 21 and 22. The air which is suctioned into the air openings 21 and 22 is ultimately blown out of the air outlets. The air duct 5 is provided within the rearward compartment 1A and has at least one air outlet or opening, preferably a plurality of outlets or openings 6 and 7 at a rearward portion of the steering column cover 12 (i.e., the end nearest the steering wheel), as shown in FIG. 2. The air outlet(s) or opening(s) 6 is directed toward a central portion of the steering wheel in a direction substantially perpendicular to the plane of the steering wheel 16 and is designed to direct warm air toward an operator's torso. The outlet(s) or opening(s) 7 is/are directed substantially toward peripheral portions of the steering wheel 16. The outlet(s) or opening(s) 7 is/are designed to direct the warm air toward an operator's limbs. The outer surface of the air duct 5 is enclosed in a heat insulating material 32, such as a sponge-like material or inorganic fiber mats. A space 33 is formed between the upper surfaces of the compartments 1 and 1A of the casing 4, on one side and the lower surface of steering column 11 on the other side. The space 33 is utilized as an enclosure in which wire harnesses used in the steering structure extends and can be safely kept.

A movable grill can be provided at the air outlet(s) or opening(s) 6 and 7 of the air duct 5 to make desired adjustments in the direction of the air blown. As described above, the air blower 2 and the heater 3 of the forward compartment 1 enclosed within the casing 4 are relatively heavy. The casing 4 is attached directly to the steering column 11. The air duct of the rearward compartment 1A is lighter than the forward compartment 1 and is fixed to the steering column cover 12. The casing 4 is attached to the sturdy steering column 11, thereby eliminating noise and vibrations resulting when the air blower 2 and the heater 3 are operated. The warm air is ventilated not only toward the operator's torso but also toward the operator's limbs. To prevent the outer surface of the column cover 12 from getting overheated the air duct 5 is covered with the heat insulating material 32.

While the present invention has been described in its preferred embodiments, it is to be understood that the invention is not limited thereto, and may be otherwise embodied within the scope of the following claims.

What is claimed is:

1. A heating apparatus for warming an operator of a vehicle comprising:
   a steering wheel;
   a steering shaft connected to said steering wheel and rotating with angular displacements of the steering wheel;
   a steering column supported by a vehicle body and substantially enclosing the steering shaft therein;
   a steering column cover enclosing the steering shaft and a portion of the steering column therein, an interval being defined between the steering column and the steering column cover, the steering column cover including at least one opening;
   a casing mounted on the steering column and located within said interval without contacting the steering column cover, and including an inlet and an outlet, a space being defined between said casing and said steering column cover;
   a blowing means located within said casing;
   a heating means located within said casing such that said blowing means and said heating means are enclosed by the casing as one unit, said unit being easily attached to the steering column, while transmitting no vibration or heat to the steering column cover; and
   a duct having an inlet, an outlet and an intermediate portion, said duct being located within said interval, said inlet of said duct being in communication with said outlet of said casing, said outlet of said duct being in communication with said at least one opening of said steering column cover, said intermediate portion of said duct being covered by insulation material, whereby vibration and heat are not transmitted to the steering column cover.

2. The heating apparatus of claim 1, wherein said air inlet passage of said casing comprises a plurality of apertures which are in communication with the air blowing means and said apertures communicate with said at least one opening in the steering column cover, said at least one opening in said steering column cover comprising a plurality of apertures.

3. The heating apparatus of claim 4, wherein the outlet of said duct comprises a plurality of openings, at least a first opening of said plurality of openings being oriented in a direction substantially perpendicular to a plane of the steering wheel and at least a second opening of said plurality of openings being oriented substantially toward a peripheral portion of the steering wheel.

4. The heating apparatus of claim 5, wherein said outlet of said duct comprises movable grills.

5. The heating apparatus of claim 6, wherein said plurality of apertures comprising the inlet of said casing have an ovular-shaped cross-section.

6. The heating apparatus of claim 5, wherein said movable grills have a rectangular-shaped cross-section.

7. The heating apparatus of claim 6, wherein said plurality of apertures comprising the inlet of said casing are provided with filters.

8. A heating apparatus for a vehicle operator comprising:
   a steering wheel;
   a steering shaft connected to said steering wheel and rotating with angular displacements of the steering wheel;
   a steering column including a lower portion and a rear portion, said steering column being supported by a vehicle body and substantially enclosing the steering shaft therein;
   a steering column cover enclosing said rear portion of the steering column therein, an interval being defined between said lower portion of said steering column and said steering column cover, said steering column cover having at least one opening;
   a casing mounted on the steering column and located within said interval without contacting the steering column cover;
   an air blowing means;
   a heating means;
   said casing comprising at least two compartments extending in a longitudinal direction of said steering column, said at least two compartments comprising:
   a forward compartment including an inlet and an outlet passage, said forward compartment enclosing said air blowing means and said heating means as one unit, said unit being easily attached to the steering column, while transmitting no vibration or heat to the steering column cover, said inlet passage being in communication with said at least one opening in the steering column cover and the air blowing means;

a rearward compartment comprising an air duct, said rearward compartment having an intermediate portion, at least one outlet passage and at least one inlet passage, said inlet passage of said rearward compartment being in communication with said outlet passage of the forward compartment, the rearward compartment being located within said interval, said intermediate portion being covered by an insulation material, so that vibration and heat are not transmitted to the steering column cover when the duct is attached to the casing; and a first mounting means for mounting said forward compartment on the steering column and a second mounting means for mounting the rearward compartment on the steering column cover.

9. The heating apparatus of claim 10, wherein said first mounting means comprises a pair of brackets provided on an upper surface of said forward compartment.

10. The heating apparatus of claim 9, wherein a vertical clearance is provided between said upper surface of the forward compartment and said vehicle steering column.

11. The heating apparatus of claim 10, wherein said pair of brackets comprises a forwardly located bracket and a rearwardly located bracket.

12. The heating apparatus of claim 11, wherein said brackets are V-shaped in cross-section.

13. The heating apparatus of claim 8, wherein the insulating material is sponge-like.

14. The heating apparatus of claim 8, wherein the insulating material is inorganic fiber mats.

15. The heating apparatus of claim 10, wherein said at least one outlet passage of said rearward compartment comprises movable grills.

16. The heating apparatus of claim 1, wherein said insulating material is sponge like.

17. The heating apparatus of claim 1, wherein the insulating material comprises inorganic fiber mats.

* * * * *